United States Patent
Kohler et al.

(10) Patent No.: US 11,311,936 B2
(45) Date of Patent: Apr. 26, 2022

(54) VALVE SEAT RING

(71) Applicant: Bleistahl-Produktions GmbH & Co KG, Wetter (DE)

(72) Inventors: Ekkehard Kohler, Wetter/Ruhr (DE); Dirk Emde, Ennepetal (DE); Ingwar Hunsche, Wetter (DE); Robert Hammelmann, Bochum (DE); Christian Blecking, Schwelm (DE); Anna Seyfarth, Dortmund (DE)

(73) Assignee: Bleistahl-Produktions GmbH & Co KG, Wetter (DE)

( * ) Notice: Subject to any disclaimer, the term of this patent is extended or adjusted under 35 U.S.C. 154(b) by 0 days.

(21) Appl. No.: 16/099,615

(22) PCT Filed: May 24, 2017

(86) PCT No.: PCT/EP2017/062681
§ 371 (c)(1),
(2) Date: Nov. 7, 2018

(87) PCT Pub. No.: WO2017/202998
PCT Pub. Date: Nov. 30, 2017

(65) Prior Publication Data
US 2019/0143415 A1    May 16, 2019

(30) Foreign Application Priority Data
May 24, 2016 (DE) .................... 10 2016 109 539.7

(51) Int. Cl.
*B22F 5/10* (2006.01)
*B22F 7/02* (2006.01)
(Continued)

(52) U.S. Cl.
CPC ............. *B22F 5/106* (2013.01); *B22F 7/02* (2013.01); *B22F 7/064* (2013.01); *C22C 1/05* (2013.01);
(Continued)

(58) Field of Classification Search
CPC ........................ F05C 2251/04; B22F 5/106
See application file for complete search history.

(56) References Cited

U.S. PATENT DOCUMENTS

| | | | | |
|---|---|---|---|---|
| 5,125,962 | A * | 6/1992 | Krentscher | C22C 1/0425 75/247 |
| 6,039,785 | A * | 3/2000 | Dalal | B22F 1/0003 75/235 |
| 2015/0322828 | A1 * | 11/2015 | Kohler | F01L 3/02 277/502 |

FOREIGN PATENT DOCUMENTS

| | | | | |
|---|---|---|---|---|
| DE | 10041974 A1 * | 3/2002 | | C23C 4/08 |
| JP | H09 53424 A | 2/1997 | | |

(Continued)

OTHER PUBLICATIONS

Espacenet machine translation of JP-10274012-A retrieved on Dec. 18, 2019 (Year: 1998).*

(Continued)

*Primary Examiner* — Jophy S. Koshy
*Assistant Examiner* — Joshua S Carpenter
(74) *Attorney, Agent, or Firm* — Brooks Kushman P.C.

(57) ABSTRACT

The invention relates to a highly heat conductive valve seat ring (1) comprising a carrier layer (2) and a functional layer (3), wherein the carrier layer (2) consists of a solidified copper matrix containing 0.10 to 20% w/w of a solidifying component and the functional layer (3) consists of a solidified copper matrix which further contains, based on the copper matrix, 5 to 35% w/w of one or more hard phases.

14 Claims, 2 Drawing Sheets

Figure 2:
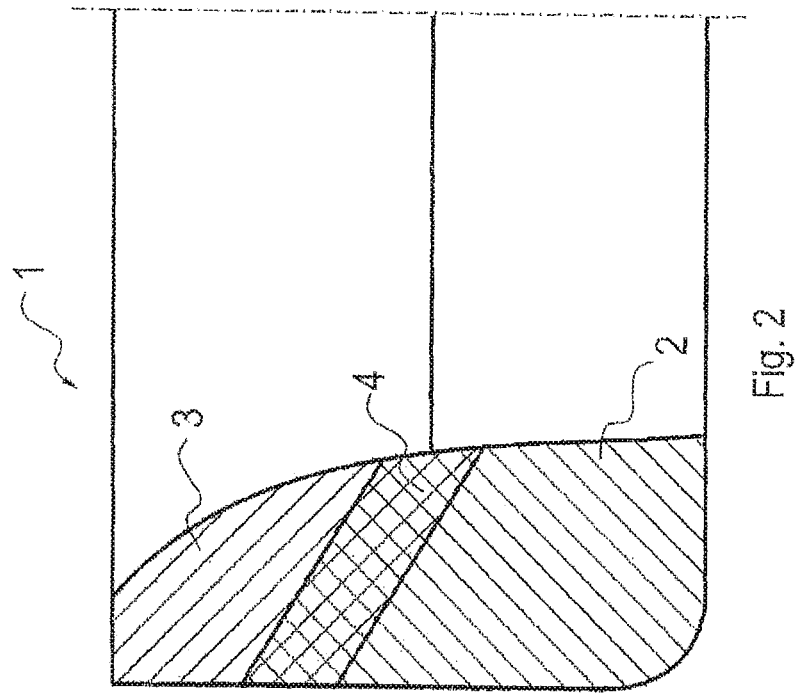

(51) Int. Cl.
  *B22F 7/06* (2006.01)
  *C22C 1/05* (2006.01)
  *C22C 9/00* (2006.01)
  *F01L 3/04* (2006.01)
  *F01L 3/08* (2006.01)
  *F16K 25/00* (2006.01)
  *C22C 32/00* (2006.01)
  *F01L 3/02* (2006.01)

(52) U.S. Cl.
  CPC ............... *C22C 9/00* (2013.01); *C22C 32/00* (2013.01); *F01L 3/02* (2013.01); *F01L 3/04* (2013.01); *F01L 3/08* (2013.01); *F16K 25/005* (2013.01); *B22F 2998/10* (2013.01); *B22F 2999/00* (2013.01); *F01L 2303/00* (2020.05); *F01L 2810/02* (2013.01); *F01L 2820/01* (2013.01); *F05C 2201/0475* (2013.01); *F05C 2251/04* (2013.01)

(56) References Cited

FOREIGN PATENT DOCUMENTS

| | | | |
|---|---|---|---|
| JP | 10274012 A | * | 10/1998 |
| JP | H10 274012 A | | 10/1998 |
| JP | 2015 127520 A | | 7/2015 |
| WO | WO 2005/059190 A1 | | 6/2005 |

OTHER PUBLICATIONS

Espacenet machine translation of DE-10041974-A1 retrieved on Dec. 18, 2019 (Year: 2002).*

* cited by examiner

VALVE SEAT RING

The invention relates to a valve seat ring having a carrier layer and a functional layer, each of which exhibiting very high thermal conductivity. The carrier layer and functional layer each have a copper base. The invention relates in particular to a powder metallurgically produced valve seat ring.

Valve seat rings of the kind first mentioned above are, for example, known from the Japanese laid-open patent application JP 6145720 A. This publication describes a copper-infiltrated multilayer valve seat ring with Co- and Mo-constituents for internal combustion engines.

In principle, the prior-art valve seat rings have an advantage in that they exhibit excellent strength. This is particularly due to the fact that two different material layers are provided, with the carrier material in that case having adequate strength values while the functional material having the properties that are essential for the sealing function, such as wear resistance.

Such prior-art valve seat rings of the kind mentioned above have a disadvantage, however, in that they can no longer meet the increasing demands of internal combustion engines due to their poor thermal conductivity properties. The thermal conductivity of conventional carrier materials is less than 45 W/mK as a rule. A high thermal conductivity helps to lower the valve temperature and contributes to environmentally friendly operation.

In order to improve the thermal conductivity of valve seat rings, it is known that powder metallurgically produced rings are infiltrated with copper. The copper content increases the thermal conductivity, but the copper absorption capacity of the pores of the material is limited.

Valve seat rings are known from DE 10 2012 013 226 A1 to have significantly improved with respect to their thermal conductivity. The rings have an increased copper content in the carrier material, which is achieved by alloying copper into the carrier matrix, by introducing sintered copper powder and by means of infiltrated copper. The copper content can account for up to 40% w/w of the carrier matrix. A thermal conductivity of up to 80 W/mK can be achieved with this material. In the functional layer, a maximum thermal conductivity of about 50 W/mK can be achieved due to the increased copper content.

A further increase in thermal conductivity can no longer be brought about with conventional materials and methods. For the carrier material in particular, a change must be made to materials that possess higher thermal conductivity.

Another problem with conventional valve seat rings concerns the dissipation of heat into the cylinder head. This requires an optimization of the heat flow, which on the one hand depends on the contact surface of the valve seat ring on the cylinder head, in particular the contact of carrier material with the cylinder head, and on the other hand also on the structure of the material. A high porosity as well as impairments in the material structure will have a negative effect on a good heat flow.

In principle, however, the two-layer structure of valve seat rings comprising a carrier matrix and a functional layer has proved its worth. In particular, it enables heat to be properly dissipated via a carrier matrix with high thermal conductivity. However, with conventional materials as they are used for the functional coatings, the possibilities for improvement have been exhausted.

The problem that occurs here is the dissipation of heat from the functional layer into the cylinder head. The functional layer itself has only a limited contact surface with the cylinder head, so that heat may accumulate at this point. For this reason, it is necessary to allow for heat dissipation via the carrier layer into the cylinder head, i.e. to use for heat transfer the contact surface between the functional layer and the carrier layer on the one hand and between the carrier layer and the cylinder head on the other hand. In this context, it makes sense to bring the materials in agreement with each other as regards their thermal conductivity.

The functional layer usually contains a hard phase, which significantly reduces thermal conductivity. As a rule, thermal conductivities not exceeding 50 W/mK are achieved.

For the individual layers of such a valve seat ring, copper offers itself as a material with high thermal conductivity. However, pure copper itself is not suitable for the purpose due to its ductility and low strength.

A copper alloy that has the necessary hardness and strength contains large amounts of beryllium, a highly toxic metal that should not be used, if possible, apart from special applications such as motor racing. Moreover, aluminum oxide is known as a solidifying/strengthening additive.

It is the objective of the invention to provide a valve seat ring of the kind mentioned above that offers via its materials significantly higher thermal conductivity properties. At the same time, this material should allow for a high heat flow. Moreover, the valve seat ring shall satisfy customary requirements with respect to tightness, dimensional accuracy, and strength.

This objective is achieved by providing a valve seat ring of the type mentioned above produced by powder metallurgy, in which the carrier layer consists of a solidified copper matrix containing 0.10 to 20% w/w of a solidifying/strengthening component and the functional layer also consists of a solidified copper matrix which further contains 5 to 35% w/w, preferably 5 to 25% w/w, of a hard phase.

Basically, the carrier layer has a thermal conductivity that exceeds the thermal conductivity of the material used for the cylinder head, in particular more than 120 W/mK at 500° C. The functional layer should have a thermal conductivity that comes as close as possible to the thermal conductivity of the cylinder head material, i.e. more than 50 W/mK, preferably above 70 W/mK at 500° C. Nevertheless, and as proposed by the invention, this may also be achieved with other materials.

The solidifying components used for the carrier layer and the functional layer can be the same or different.

The valve seat rings proposed by the present invention are so-called double-layer valve seat rings in which a carrier layer forming the base is superimposed with a functional layer. According to the invention, the carrier layer consists of a solidified copper matrix with 0.10 to 20% w/w, preferably 0.25 to 15% w/w, of one or more solidifying components. As solidifying components, oxides and intermetallic phases are particularly suitable.

For example, aluminum oxide, silicon dioxide and yttrium oxide can be used as solidifying oxides. Moreover, oxides of rare earth metals and titanium dioxide also suit the purpose.

Preferred solidifying components are aluminum oxide, $Al_2O_3$, yttrium oxide, $Y_2O_3$ and titanium oxide $TiO_2$, which can be added to copper in an amount preferably ranging between 0.1 and 2.5% w/w. Such a small amount added is already sufficient to increase the high temperature strength of the copper and, at the same time, reduce thermal conductivity only slightly. Intermetallic phases are especially those based on Cu, Cr, Nb, Ni, Zr and Si. Examples in this context are $Cr_2Nb$, $Cu_5Zr$, $Cr_2Zr$, $Ni_2Si$, $Ni_3Si$, $Ni_{31}Si_{12}$ and CuZr. Such intermetallic phases are formed during cooling by precipitation from the supersaturated matrix in finely dispersed form.

Preferred are intermetallic phases of chromium and niobium, e.g. $Cr_2Nb$, which, for example, can be used in an amount ranging between 2 and 15% w/w. Chromium and zircon in an amount of between 0.5 and 5% w/w offer similar benefits.

Another suitable component are nickel-silicon phases, such as $Ni_2Si$, $Ni_3Si$ or $Ni_{31}Si_{12}$, for example in an amount of 0.5 to 5% w/w.

Finally, the use of copper-zirconium phases, such as $Cu_5Zr$ or $CuZr$ in an amount of up to 5% w/w, is also conducive to bringing about the desired solidification. In any case, silver may also be added, which has the advantage of making a positive contribution to thermal conductivity. Silver may be added up to an amount of 10% w/w.

A solidified copper matrix as described above is employed for the functional layer, but this matrix is additionally provided with a hard phase in an amount of 5 to 35% w/w, preferably 5 to 25% w/w. Such a hard phase is mixed for example as alloying powder with the copper powder, whereby the alloying powder can form intermetallic phases. The percentage of the hard phase refers to the weight of the solidified copper matrix of the functional layer.

The hard phase can in particular be based on iron, nickel or cobalt. Carbides, oxidic ceramics or nitridic ceramics may also be employed. It is essential that the hard phase is incorporated in the solidified copper matrix and provides the necessary wear resistance.

For example, a known iron-based hard phase can be used as a hard phase with cobalt, carbon, molybdenum, vanadium and tungsten. Alternatively, a cobalt hard phase with molybdenum, silicon and chromium, if necessary also nickel, can be used.

The following carbide materials are particularly suitable: tungsten carbide, silicon carbide, titanium carbide and chromium carbide. For example, aluminum oxide can be employed as an oxidic ceramic and titanium nitride, chromium nitride and cubic boron nitride as a nitridic ceramic material.

The functional layer can contain customary solid lubricants, for example MnS, $MoS_2$, $WS_2$ $CaF_2$ or hexagonal boron nitride, usually in amounts ranging between 0.1 and 5% w/w, with reference to the solidified copper matrix.

An overview of the materials that are used can be found in Table 1 (carrier materials) and Table 2 (hard phases for the functional material).

The preferred material for solidifying the copper matrix is $Al_2O_3$, by means of which the desired solidification can be achieved even with small quantities being used.

The preferred hard phase is based on iron, nickel or cobalt, in particular of the Tribaloy type, such as T400 and T800.

In any case, the valve seat ring proposed by the invention has a two-layer structure. The dividing line between the layers can be of more or less horizontal configuration, that is, the two layers rest on each other and combine in the contact zone under the influence of pressure and temperature. However, an inclined configuration of the dividing layer with an angle of up to 65°, in particular from 35° to 65°, is preferred, with the carrier layer expanding towards the outside and thus creating a large contact surface to the cylinder head as well as to the functional layer. Especially preferred are angles ranging between 40° and 55°.

The carrier layer of the inventive valve seat rings has a thermal conductivity of ≥120 W/mK at 500° C. and preferably of ≥220 W/mK at 500° C. Thermal conductivities of more than 300 W/mK at 500° C. can be achieved, which is equivalent to three to four times the previously achievable thermal conductivities.

In the functional layer, thermal conductivities of more than 70 to 250 W/mK can be achieved at 500° C., which is also far above the values achievable until now.

In order to increase thermal conductivity, the valve seat rings according to the invention can be infiltrated both in the carrier layer and in the functional layer. The functional layer may furthermore contain other additives that promote the function, for example lubricants such as molybdenum sulfide or metallic additives such as molybdenum or niobium. Such additives may be present in an order of magnitude of up to 15% w/w, with reference to the weight of the functional layer. Molybdenum and niobium, which are added in the form of powder to the green compact to be sintered, oxidize superficially and are conducive to reducing friction.

Copper alloys, for example, but also silver and silver alloys can be used for infiltration.

The valve seat rings according to the invention are manufactured in particular by powder metallurgy. The valve seat rings proposed by the invention can be manufactured according to a process which involves the compaction and sintering of the relevant powders in several steps to simultaneously form a carrier layer with a functional layer, that is:
Mixing the powders,
Filling the powder of the carrier layer into a molding die,
Pre-compacting the powder of the carrier layer if necessary,
Filling the powder of the functional layer into the molding die,
Compacting the powder in the die,
Sintering the powder to form a sintered ring, and
Thermal and/or mechanical post-treatment of the sintered rings.

Uniaxial pressing can be applied for the compaction of the powder, but cold isostatic pressing (CIP) for example is also possible as an alternative.

Sintering may also be followed by a hot isostatic process (HIP) or replace this step. The sintering steps take place at a temperature of e.g. ≥850° C.

It may be advisable to redensify the powders after the first sintering step and, if necessary, repeat sintering.

Unless otherwise stated, all weight indications are based on the weight of the respective layer. The valve seat rings according to the invention may be provided with a coating.

The invention is explained in more detail by way of the enclosed figures.

Figure 1:
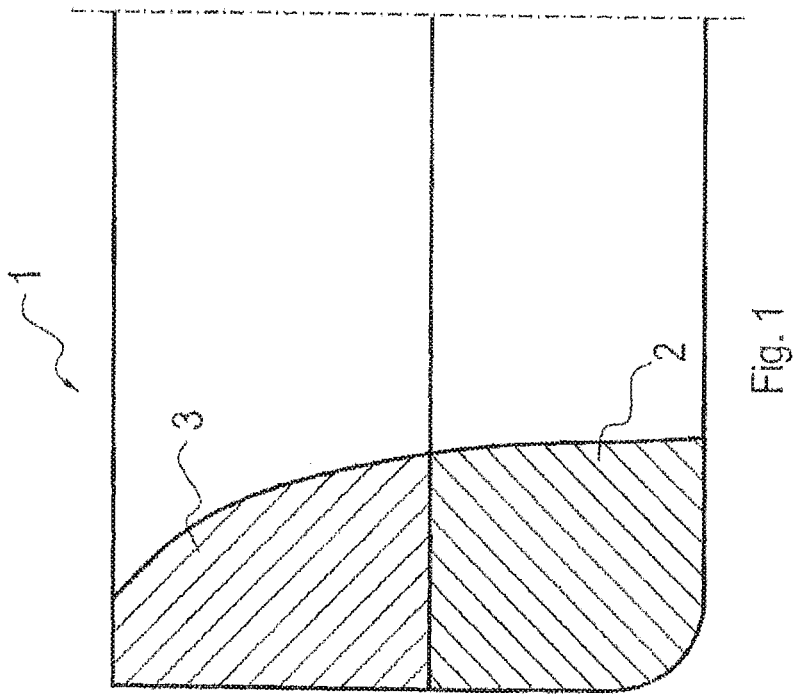

FIG. 1 shows a valve seat ring 1 as proposed by the invention in cross sectional representation with a lower carrier layer 2 and a functional layer 3 arranged on it. The dividing line between the two layers is essentially horizontal.

FIG. 2 is a cross-sectional view through a valve seat ring 1 according to the invention with an inclined dividing line existing between the carrier layer 2 and the functional layer 3. The carrier layer 2 thus expands towards the outer edge and in this manner increases the contact surface with the surrounding cylinder head. This results in an improved heat flow to be achieved into the cooled cylinder head. Between the layers there is a transition area 4, in which the dividing line runs between the carrier layer 2 and the functional layer 3.

Figure 3:
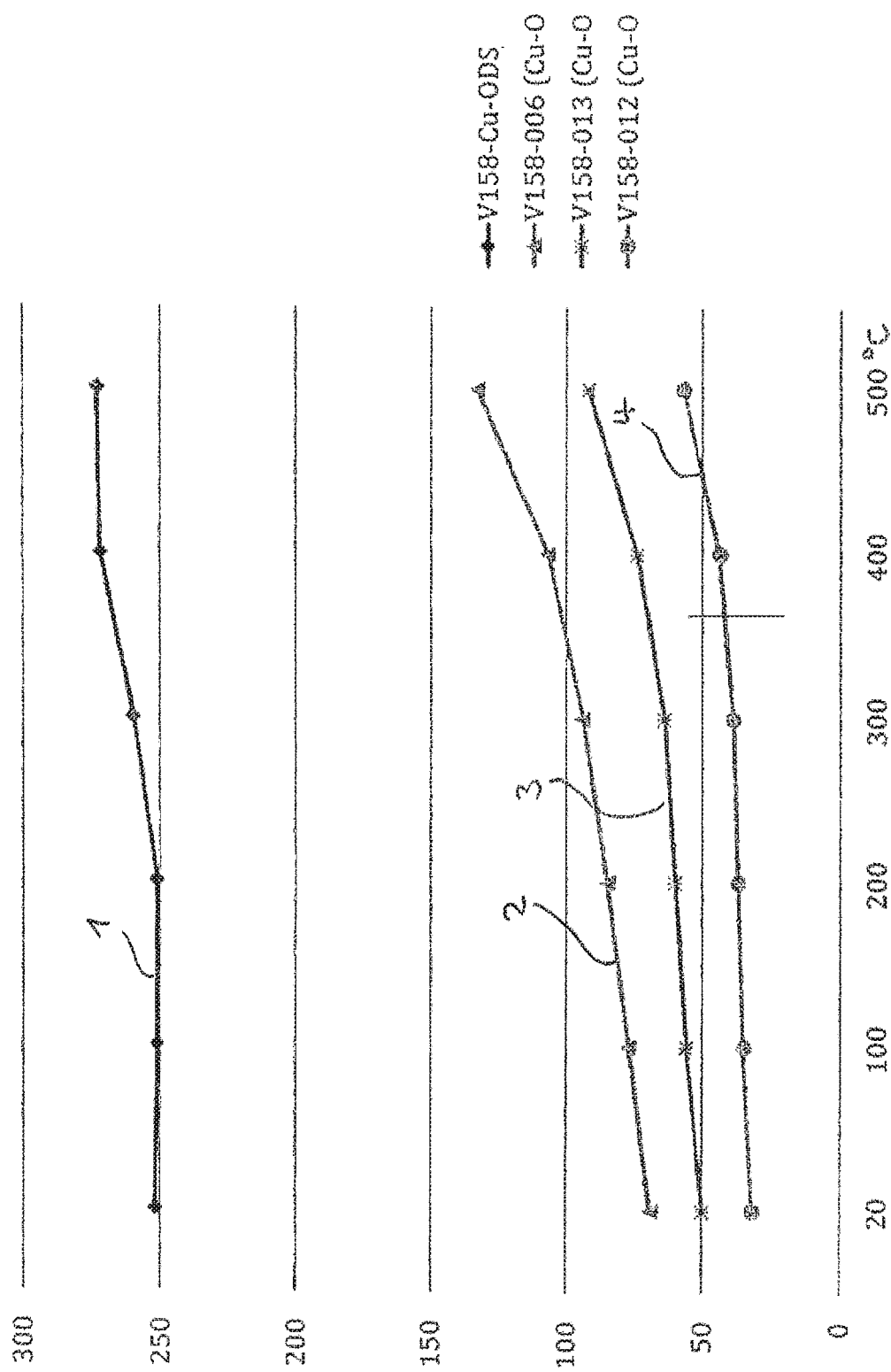

In FIG. 3 the thermal conductivity values of different materials within the scope of the invention are shown at different temperatures. The materials are as follows:

1. A carrier material consisting of oxide-reinforced copper;
2. A functional material with 20% of a hard phase;
3. A functional material with 30% of a hard phase;
4. A functional material with 40% of a hard phase.

For all functional materials, the carrier matrix is the same as in the carrier material.

TABLE 1

Base material for the carrier layer

| Designation | Strength due to | Thermal conductivity [W/mk] 20° C. | Thermal conductivity [W/mk] 400° C. | Chemical composition [% w/w] Cu | Al$_2$O$_3$ | Cr | Zr | Nb | Ag | Ni | Si |
|---|---|---|---|---|---|---|---|---|---|---|---|
| Cu + Al$_2$O$_3$ | Al$_2$O$_3$ | 322-344 | 280-320 | Base | 0.1-1.1 | | | | | | |
| Cu + Cr$_2$Nb | Cr$_2$Nb | 280-345 | 290-350 | Base | | 1.5-6.5 | | 3.6-5.5 | up to 4.9 | | |
| Cu + CrZr | Cu$_5$Zr/Cr$_2$Zr/Cr | 280-380 | 300-370 | Base | | up to 0.8 | 0.08-0.5 | | up to 3 | | |
| Cu + NiSi | Ni$_2$Si/Ni$_3$Si/Ni$_{31}$Si$_{12}$ | 180 | 225 | Base | | 0.5 | | | | 2.4 | 0.7 |

TABLE 2

Hard phase for the functional layer a) Alloying powder forming intermetallic phases

| Designation | Fe | Co | C | Mo | V | Si | Cr | Ni |
|---|---|---|---|---|---|---|---|---|
| HS 6-5-4 | Base | max. 1.0 | 1.15-1.40 | 4.25-5.25 | 3.75-4.75 | | | |
| FeMo29Cr9.5Si2.6 | Base | | max. 0.03 | 28.0-30.0 | | 2.20-3.20 | 8.50-10.50 | |
| 28Mo—9Cr—2.6Si—0.04C | | Base | max. 0.15 | 27.0-29.0 | | 2.50-3.50 | 7.0-9.0 | max. 3 |
| 28Mo—17Cr—3.4Si—0.04C | | Base | max. 0.15 | 27.0-29.0 | | 3.4 | 17.5 | max. 3 |
| 23Mo—17Cr—16Ni—2.7Si—0.04C | | Base | | 23 | | 2.7 | 18 | 18 |

| b) Carbidic ceramics | | c) Oxidic Ceramics | | d) Nitridic Ceramics | |
|---|---|---|---|---|---|
| Designation | | Designation | | Designation | |
| WC | Tungsten carbide | Al$_2$O$_3$ | Aluminum oxide | CBN | Cubic boron nitride |
| SIC | Silicon carbide | Y$_2$O$_3$ | Yttrium oxide | TIN | Titanium nitride |
| TIC | Titanium carbide | | | CrN | Chromium nitride |
| CrC | Chromium carbide | | | | |

The invention claimed is:

1. A valve seat ring (1) consisting of a carrier layer (2) and a functional layer (3), wherein:
   the carrier layer (2) forming a base and being superimposed with the functional layer (3),
   the carrier layer (2) and the functional layer (3) having a contact zone between them having a pressure and temperature formed transition area;
   the carrier layer (2) consists of a first solidified copper matrix containing 0.10 to 20% w/w of a solidifying component selected from: aluminum oxide (Al$_2$O$_3$), yttrium oxide (Y$_2$O$_3$), silicon dioxide (SiO$_2$), rare earth metal oxides, and titanium dioxide (TiO$_2$); and
   the functional layer (3) consists of a second solidified copper matrix containing, 5 to 35% w/w of one or more hard phases selected from: iron-based HS 6-5-4, iron-based FeMo29Cr9.5Si2.6, cobalt-based 28Mo-9Cr-2.6Si-0.04C, cobalt-based 28Mo-17Cr-3.4Si-0.04C, cobalt-based 23Mo-17Cr-16Ni-2.7Si-0.04C, tungsten carbide (WC), silicon carbide (SiC), titanium carbide (TiC) and chromium carbide (CrC), titanium nitride (TiN), chromium nitride (CrN) and cubic boron nitride (CBN).

2. The valve seat ring according to claim 1, characterized in that the solidifying component is aluminum oxide (Al$_2$O$_3$).

3. The valve seat ring according to claim 1, characterized in that the functional layer contains 0.1 to 5% w/w of a solid lubricant selected from: MnS, MoS$_2$, WS$_2$, CaF$_2$ or hexagonal BN.

4. The valve seat ring according to claim 1, characterized in that a dividing line between carrier layer (2) and functional layer (3) extends at an angle of 0° to 65°, with the carrier layer (2) widening towards the outside thereby determining the slope of the dividing line.

5. The valve seat ring according to claim 1, characterized in that a thermal conductivity of the carrier layer (2) is ≥ (greater than or equal to) 120 W/mK at 500° C.

6. The valve seat ring according to claim 1, characterized in that a thermal conductivity of the functional layer (3) is ≥ (greater than or equal to) 70 W/mK at 500° C.

7. The valve seat ring according to claim 1, characterized in that the valve seat rind is manufactured by powder metallurgy.

8. The valve seat ring according to claim 1, characterized in that the valve seat ring is provided with a coating.

9. The valve seat ring according to claim 4, characterized in that the dividing line extends at an angle of between 35° and 65°.

10. The valve seat ring according to claim 5, characterized in that the thermal conductivity of the carrier layer (2) is ≥ (greater than or equal to) 220 W/mK at 500° C.

11. A method of manufacturing the valve seat ring according to claim 1, characterized by the following steps:

Providing respective powders for the carrier layer and the functional layer,

Mixing the respective powders for the carrier layer and the functional layer,

Filling the powder of the carrier layer (2) into a molding die,

Optionally pre-compacting the powder of the carrier layer (2),

Filling the powder of the functional layer (3) into the molding die,

Compacting the respective powders in the molding die,

Forming the carrier layer and functional layer by simultaneously sintering and optionally subjecting the respective powders to hot isostatic process in the molding die to form a sintered ring with the contact zone between the carrier layer and the functional layer, the contact zone having the pressure and temperature formed transition area, and Thermally or mechanically after-treating the sintered ring.

12. The method according to claim 11, characterized in that the respective powders are post-compacted and/or post-sintered after the forming step.

13. The method according to claim 11, characterized in that the simultaneous sintering is carried out at a temperature of ≥ (greater than or equal to) 850° C.

14. The method according to claim 11, characterized in that the compacting the respective powders is carried out by means of cold isostatic pressing.

* * * * *